US012443131B2

(12) United States Patent
Kumagai et al.

(10) Patent No.: US 12,443,131 B2

(45) Date of Patent: Oct. 14, 2025

(54) IMAGE FORMING APPARATUS HAVING TRANSFER MEMBER WITH SPECIFIC RESISTANCE

(71) Applicants: Naohiro Kumagai, Kanagawa (JP); Yuusuke Furuichi, Kanagawa (JP); Daisuke Hirano, Kanagawa (JP)

(72) Inventors: Naohiro Kumagai, Kanagawa (JP); Yuusuke Furuichi, Kanagawa (JP); Daisuke Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/836,218

(22) PCT Filed: Mar. 2, 2023

(86) PCT No.: PCT/IB2023/051925

§ 371 (c)(1),
(2) Date: Aug. 6, 2024

(87) PCT Pub. No.: WO2023/175426

PCT Pub. Date: Sep. 21, 2023

(65) Prior Publication Data

US 2025/0044727 A1 Feb. 6, 2025

(30) Foreign Application Priority Data

Mar. 18, 2022 (JP) ................................ 2022-044148

(51) Int. Cl.
*G03G 15/16* (2006.01)

(52) U.S. Cl.
CPC ....... *G03G 15/1685* (2013.01); *G03G 15/167* (2013.01); *G03G 2215/1614* (2013.01)

(58) Field of Classification Search
CPC ............. G03G 15/167; G03G 15/2017; G03G 15/0189; G03G 15/1685; G03G 2215/0122; G03G 2215/1614
(Continued)

(56) References Cited

U.S. PATENT DOCUMENTS

| | | | | |
|---|---|---|---|---|
| 10,527,973 | B1 * | 1/2020 | Yamaura | G03G 15/1605 |
| 2011/0091236 | A1 | 4/2011 | Oi et al. | |

(Continued)

FOREIGN PATENT DOCUMENTS

| | | | |
|---|---|---|---|
| JP | 2013-113910 | A | 6/2013 |
| JP | 2020-052345 | A | 4/2020 |

OTHER PUBLICATIONS

International Search Report and Written Opinion issued on May 22, 2023 in PCT/IB2023/051925 filed on Mar. 2, 2023.

(Continued)

*Primary Examiner* — Robert B Beatty

(74) *Attorney, Agent, or Firm* — Harness, Dickey & Pierce, P.L.C.

(57) ABSTRACT

An image forming apparatus includes a fixing device, a power supply, and a transfer device. The fixing device includes a fixing belt grounded via a protective resistor, a heater contacting the fixing belt, and a pressure rotator grounded and facing the fixing belt to form a nip. The power supply applies an alternating current voltage to the heater. The transferor device includes a transferor grounded and an opposed rotator facing the transferor to form a nip. The transferor has a transfer resistance Rt satisfying a following expression, $$\left| \frac{Rf \, // \, (jXs + Rp + Rt)}{jXh + Rf \, // \, (jXs + Rp + Rt)} \cdot \frac{Rt}{jXs + Rp + Rt} \right| < 0.3$$

(Continued)

where Rf is a resistance value of the protective resistor, Rp is a resistance value of a recording medium, jXs is an impedance of the fixing belt, and jXh is an impedance of the heater.

5 Claims, 6 Drawing Sheets

(58) Field of Classification Search
USPC ........................... 399/66, 302, 308, 313, 314
See application file for complete search history.

(56) References Cited

U.S. PATENT DOCUMENTS

| | | | | |
|---|---|---|---|---|
| 2015/0003880 | A1* | 1/2015 | Ohno | G03G 15/80 399/302 |
| 2016/0161887 | A1 | 6/2016 | Sugiura et al. | |
| 2016/0161888 | A1 | 6/2016 | Wada et al. | |
| 2016/0274503 | A1 | 9/2016 | Sugiura et al. | |
| 2016/0274504 | A1 | 9/2016 | Wada et al. | |
| 2016/0274505 | A1 | 9/2016 | Ohsugi et al. | |
| 2016/0306317 | A1 | 10/2016 | Wada et al. | |
| 2016/0334738 | A1 | 11/2016 | Kochi et al. | |
| 2016/0334739 | A1 | 11/2016 | Ohsugi et al. | |
| 2017/0003630 | A1 | 1/2017 | Ohsugi et al. | |
| 2017/0235257 | A1 | 8/2017 | Kochi et al. | |
| 2017/0235258 | A1 | 8/2017 | Wada et al. | |
| 2017/0329263 | A1 | 11/2017 | Sugiura et al. | |
| 2017/0363993 | A1* | 12/2017 | Sasame | G03G 15/2039 |
| 2020/0249602 | A1 | 8/2020 | Inoue et al. | |
| 2021/0278790 | A1 | 9/2021 | Furuichi et al. | |
| 2022/0382191 | A1 | 12/2022 | Furuichi et al. | |
| 2023/0229101 | A1 | 7/2023 | Shida et al. | |

OTHER PUBLICATIONS

Jun Asami, et al.,"The Horizontal Banding Image related to the Surface Heating Fuser System" Society for Imaging Science and Technology, 2010, p. 238-241.

* cited by examiner

IMAGE FORMING APPARATUS HAVING TRANSFER MEMBER WITH SPECIFIC RESISTANCE

CROSS-REFERENCE TO RELATED APPLICATIONS

This application is a national phase under 35 U.S.C. § 371 of PCT International Application No. PCT/IB2023/051925, which has an International filing date of Mar. 2, 2023, which claims priority to Japanese Application No. 2022-044148, filed Mar. 18, 2022, the entire contents of each of which are hereby incorporated by reference.

TECHNICAL FIELD

Embodiments of the present disclosure relate to an image forming apparatus.

BACKGROUND ART

In an electrophotographic image forming apparatus, an alternating current (AC) voltage of a commercial power supply or a direct current (DC) voltage converted by rectifying the AC voltage is applied to a resistive heat generator in a fixing device. The method that does not rectify the AC voltage does not need a rectifier circuit, which prevents an increase in cost. However, using the AC voltage that is not rectified may cause a disadvantage called AC banding that is density unevenness in an image.

The image forming apparatus has a fixing nip formed by a fixing belt and a pressure roller and a transfer nip formed by a transfer roller and a roller facing the transfer roller. In the image forming apparatus, the AC voltage is applied to a heater in contact with the fixing belt to heat the fixing belt. The AC voltage may be transmitted to the fixing nip via the fixing belt, and a recording medium nipped by the fixing nip and the transfer nip at the same time transmits the AC voltage from the fixing nip to the transfer nip. The AC voltage transmitted to the transfer nip causes fluctuation in a transfer electric field in the transfer nip, thereby causing transfer unevenness. As a result, a stripe pattern (that is, the density unevenness) occurs in the image. The above-described phenomenon is called the AC banding, and hereinafter, the above-described density unevenness is also referred to as the AC banding.

To prevent the occurrence of the AC banding, Japanese Unexamined Patent Application Publication No. 2013-113910 discloses the fixing device including the pressure roller, a fixing roller, and a heating roller. The pressure roller and the fixing roller form the fixing nip, and the fixing roller and the heating roller form a heating nip. The Japanese Unexamined Patent Application Publication No. 2013-113910 discloses a resistance value between the fixing nip and the heating nip satisfying a predetermined relationship. According to the Japanese Unexamined Patent Application Publication No. 2013-113910, satisfying the predetermined relationship enables preventing the density unevenness in the image caused by superimposition of an AC component of the AC voltage on the transfer electric field in the secondary transfer nip.

CITATION LIST

Patent Literature

[PTL 1]
Japanese Unexamined Patent Application Publication No. 2013-113910

SUMMARY OF INVENTION

Technical Problem

However, the configuration disclosed in the Japanese Unexamined Patent Application Publication No. 2013-113910 requires the heating roller to form the heating nip between the fixing roller and the heating roller. As a result, the configuration disclosed in the Japanese Unexamined Patent Application Publication No. 2013-113910 has disadvantages such as limiting the configuration and a complicated configuration.

Alternatively, decreasing the AC voltage transmitted from the fixing nip to the transfer nip may be considered to prevent the occurrence of the AC banding. To decrease the AC voltage, for example, decreasing a fixing grounding resistance may be considered. However, if the fixing grounding resistance is too small, occurrence of lightning may cause a lightning surge that applies a high voltage to the image forming apparatus from a power source connected to a resistive heat generator.

For this reason, a technique that prevents the occurrence of the AC banding without increasing the manufacturing cost and is advantageous to the lightning surge is desired.

An object of the present disclosure is to provide an image forming apparatus that can prevent the occurrence of the AC banding without increasing the manufacturing cost and is advantageous to the lightning surge.

Solution to Problem

According to an embodiment of the present disclosure, an image forming apparatus includes a fixing device, a power supply, and a transfer device. The fixing device includes a rotatable fixing belt, a heater, and a pressure rotator. The fixing belt is grounded via a first grounding path from the fixing belt to a ground. The first grounding path includes a protective resistor. The heater is in contact with an inner circumferential surface of the fixing belt. The pressure rotator faces the fixing belt to form a fixing nip and is grounded via a second grounding path. The power supply applies an alternating current voltage to the heater. The transfer device is disposed upstream from the fixing device in a recording medium conveyance direction of a recording medium. The transfer device includes a rotatable transferor and an opposed rotator. The transferor is grounded via a third grounding path. The opposed rotator faces the transferor to form a transfer nip. The transferor has a transfer resistance satisfying a following expression, $$\left| \frac{Rf \,//\, (jXs + Rp + Rt)}{jXh + Rf \,//\, (jXs + Rp + Rt)} \cdot \frac{Rt}{jXs + Rp + Rt} \right| < 0.3$$

where Rt is a resistance value of the transferor resistance, Rf is a grounding resistance value of the protective resistor, Rp is a resistance value of the recording medium, jXs is an impedance of the fixing belt, and jXh is an impedance of the heater.

Advantageous Effects of Invention

The present disclosure provides the image forming apparatus that can prevent the occurrence of the AC banding without increasing the manufacturing cost and is advantageous to the lightning surge.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
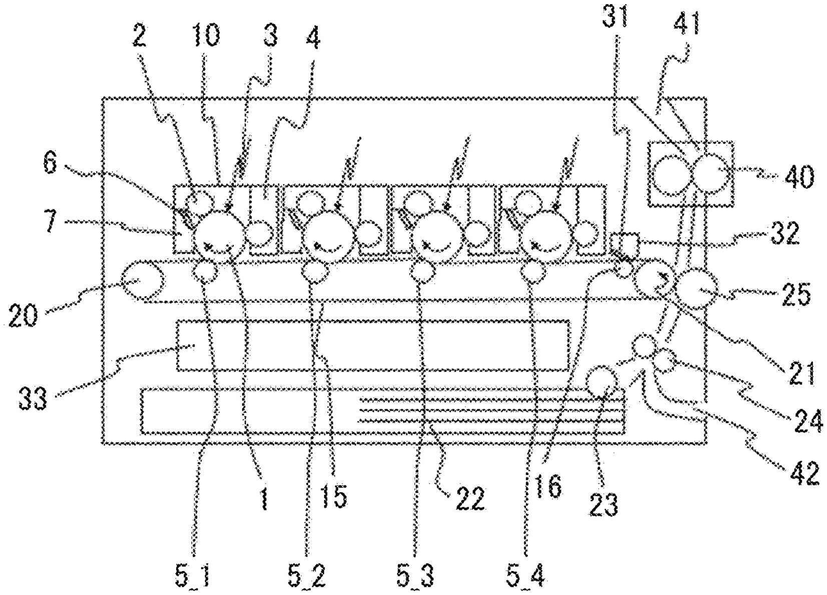
FIG. 1 is a schematic view of an image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

A description is provided of an image forming apparatus according to the present disclosure with reference to drawings. It is to be noted that the present disclosure is not to be considered limited to the following embodiments but can be changed within the range that can be conceived of by those skilled in the art, such as other embodiments, additions, modifications, deletions, and the scope of the present disclosure encompasses any aspect, as long as the aspect achieves the operation and advantageous effect of the present disclosure.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The image forming apparatus according to the present disclosure includes a fixing device, a power supply, and a transfer device. The fixing device includes a rotatable fixing belt, a heater, and a pressure rotator. The fixing belt is grounded via a first grounding path from the fixing belt to a ground. The first grounding path includes a protective resistor. he heater is in contact with an inner circumferential surface of the fixing belt. The pressure rotator faces the fixing belt to form a fixing nip and is grounded via a second grounding path. The power supply applies an alternating current voltage to the heater. The transfer device is disposed upstream from the fixing device in a recording medium conveyance direction of a recording medium. The transfer device includes a rotatable transferor and an opposed rotator. The transferor is grounded via a third grounding The opposed rotator faces the transferor to form a transfer nip. The transferor has a transfer resistance satisfying a following expression, $$\left|\frac{Rf\ //\ (jXs + Rp + Rt)}{jXh + Rf\ //\ (jXs + Rp + Rt)} \cdot \frac{Rt}{jXs + Rp + Rt}\right| < 0.3$$

where Rt is a resistance value of the transferor resistance, Rf is a grounding resistance value of the protective resistor, Rp is a resistance value of the recording medium, jXs is an impedance of the fixing belt, and jXh is an impedance of the heater.

The present disclosure provides the image forming apparatus that can prevent the occurrence of AC banding without increasing the manufacturing cost and is advantageous to the lightning surge.

FIG. 1 is a schematic view of an image forming apparatus according to an embodiment of the present disclosure. The image forming apparatus includes four process units 10 arranged side by side. The four process units form, for example, black, cyan, magenta, and yellow images, respectively but have a same configuration. Each process unit 10 includes a photoconductor 1, a charger 2, a developing device 4, and a photoconductor cleaning unit 7.

The Photoconductor 1 is a cylindrical photoconductor drum and rotates in a direction indicated by an arrow in each of the process unit of FIG. 1. The photoconductor may be referred to as an electrostatic latent image bearer, an image bearer, or the like.

The charger 2 is an example of a charging device and has, for example, a roller shape. The charger 2 is pressed against the surface of each photoconductor 1 and rotated by the rotation of the photoconductor 1. A high-voltage power source applies a direct current (DC) bias or a bias in which an alternating current (AC) bias is superimposed on a DC bias to the charger 2 to uniformly charge the photoconductor 1. The charger 2 may be a charging roller, a corotron, or a scorotron.

After the charger 2 charges the photoconductor 1, an exposure device 3 as a latent image forming device irradiates the photoconductor 1 with light based on image data to form an electrostatic latent image on the photoconductor 1 based on image data. The exposure device 3 includes, for example, light emitting diodes (LEDs) or a laser beam scanning device including a laser diode.

A high-voltage power source supplies a predetermined developing bias to the developing device 4, and the developing device 4 visualizes the electrostatic latent image on the photoconductor 1 as a toner image. The developing devices 4 each contain color toner.

The four process units 10 form a black toner image, a cyan toner image, a magenta toner image, an yellow toner image, respectively, and the four color toner images are sequentially transferred and superimposed onto the transfer belt 15 to form a full color image.

The photoconductor cleaning unit 7 includes a cleaning blade 6 for cleaning the photoconductor 1.

The transfer belt 15 is stretched by a secondary-transfer backup roller 21, a cleaning backup roller 16, primary transfer rollers 5, and a tension roller 20. A drive motor drives to rotate the secondary-transfer backup roller 21, and the secondary-transfer backup roller 21 rotates the transfer belt 15. As a mechanism for stretching the transfer belt 15, springs press both ends of the tension roller 20. The secondary-transfer backup roller 21 is an example of an opposed rotator and faces a transferor such as the secondary transfer roller 25. The secondary transfer roller 25 and the secondary-transfer backup roller 21 perform a secondary-transfer process.

The image forming apparatus may include a common driver driving the process units 10 and the secondary-transfer backup roller 21 or separate drivers each driving the process units 10 or the secondary-transfer backup roller 21. At least, driving the process unit forming the black image and driving a transfer member are generally turned ON/OFF. From the viewpoint of downsizing and cost reduction of the image forming apparatus, the common driver is preferable.

The image forming apparatus include a transfer belt cleaning unit 32 including a cleaning blade 31 that is brought into counter contact with the transfer belt 15. In the transfer belt cleaning unit 32, the cleaning blade 31 scrapes off transfer residual toner on the transfer belt 15 to clean the transfer belt 15.

Instead of the above-described blade cleaning system, a cleaning system to clean the transfer belt 15 may be an electrostatic system such as an electrostatic brush system or an electrostatic roller system. The blade cleaning system is preferable from the viewpoints of downsizing, cost reduction, and cleanability of a transfer device. The electrostatic system using a brush or a roller to which a bias is applied may require pre-charging the transfer residual toner depending on the use state of the image forming apparatus. As a result, the electrostatic system increases the size of the cleaning unit. One or two high-voltage power sources may be added to the image forming apparatus, and the image forming apparatus may perform an additional operation for bias cleaning.

The transfer residual toner scraped off by the cleaning blade 31 is conveyed through a toner conveyance passage and stored in a waste toner storage 33 for an intermediate transferor.

Primary transfer rollers 5-1 to 5-4 are, for example, metal rollers or conductive sponge rollers and are disposed so as to face the photoconductors 1 via the transfer belt 15, respectively. A single high-voltage power supply applies a primary transfer bias to the primary transfer rollers 5-1 to 5-4 as primary transferors to primarily transfer the toner images (that is, visible images) on the photoconductors 1 to the transfer belt 15.

The metal rollers used as the primary transfer rollers 5-1 to 5-4 may be made of, for example, aluminum, steel use stainless (SUS) or the like. The conductive sponge rollers used as the primary transfer rollers 5-1 to 5-4 may be, for example, ion conductive rollers. The ion conductive roller may be made of, for example, urethane in which carbon is dispersed, acrylonitrile butadiene rubber (NBR), hydrin rubber, or the like. In addition to the above, the primary transfer rollers 5-1 to 5-4 may be electron conductive type rollers or the like. The electron conductive type roller may be made of, for example, ethylene-propylene-diene monomer (EPDM).

The transfer belt 15 is a film-like endless belt made of resin in which a conductive material such as carbon black is dispersed. The resin may be polyvinylidene fluoride (PVDF), ethylene tetrafluoroethylene (ETFE), polyimide (PI), polycarbonate (PC), and thermoplastic elastomer (TPE). The transfer belt 15 is an example of an intermediate transferor.

The image forming apparatus illustrated in FIG. 1 includes a secondary transfer device. The secondary transfer device may be a roller-type secondary transfer device including the secondary transfer roller 25 as illustrated in FIG. 1 or a belt-type secondary transfer device including a belt.

The secondary transfer roller 25 may be, for example, a sponge roller, an ion conductive roller, an electron conductive roller, or the like. The ion conductive roller may be made of, for example, urethane in which carbon is dispersed, acrylonitrile-butadiene rubber (NBR), hydrin rubber, or the like. The electron conductive roller may be made of, for example, ethylene-propylene-diene monomer (EPDM).

A drive motor drives the secondary transfer roller 25. A high voltage power source applies a bias to the secondary transfer roller 25.

Preferably, the secondary transfer roller 25 is cleaned by a cleaning unit. The cleaning unit includes, for example, a cleaning blade that comes into counter contact with the secondary transfer roller 25. The cleaning blade scrapes residual toner from the secondary transfer roller 25 to clean the secondary transfer roller 25. Such a cleaning unit may be, for example, a cleaning unit 27 illustrated in FIG. 2 to be described later.

Figure 2:
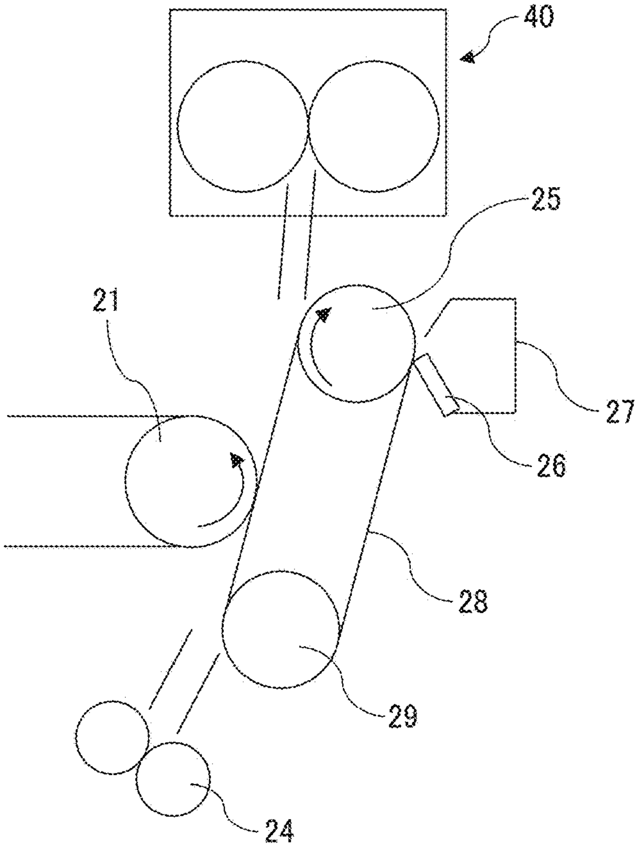
FIG. 2 is a schematic view of a main part of a belt-type secondary transfer device.

FIG. 2 is a schematic view of a main part of the belt-type secondary transfer device to illustrate the belt-type secondary transfer device. FIG. 2 is a partial view of FIG. 1, in which the roller-type secondary transfer device is changed to the belt-type secondary transfer device.

The belt-type secondary transfer device includes a secondary transfer belt 28 stretched by the secondary transfer roller 25 and a tension roller 29. A drive motor drives and rotates the secondary transfer roller 25, and the secondary transfer roller 25 rotates the secondary transfer belt 28.

The secondary transfer belt 28 may be, for example, a belt similar to the transfer belt 15. The secondary transfer belt 28 is a film-like endless belt made of resin in which a conductive material such as carbon black is dispersed. The resin may be PVDF, ETFE, PI, PC, and TPE.

Referring back to FIG. 1, a sheet as a recording medium or a recording material may be set in a sheet tray 22 or a manual feed port 42. A sheet feed conveyance roller 23 and a registration roller pair 24 feed and convey the set sheet to a secondary transfer position, timed to coincide with the arrival of the tip of the toner image on the transfer belt 15 to the secondary transfer position. To perform the secondary-transfer process, a high voltage power supply applies a predetermined secondary transfer bias to the secondary transfer roller 25 to transfer the toner image on the transfer belt 15 onto the sheet.

In the present embodiment, a recording medium passage is a vertical passage, but is not limited to this. The sheet is separated from the secondary transfer belt 28 by the curvature of the secondary transfer roller 25 and is conveyed to a fixing device 40. The fixing device 40 fixies the transferred toner image onto the sheet, and the sheet is ejected from an ejection port 41.

Figure 3:
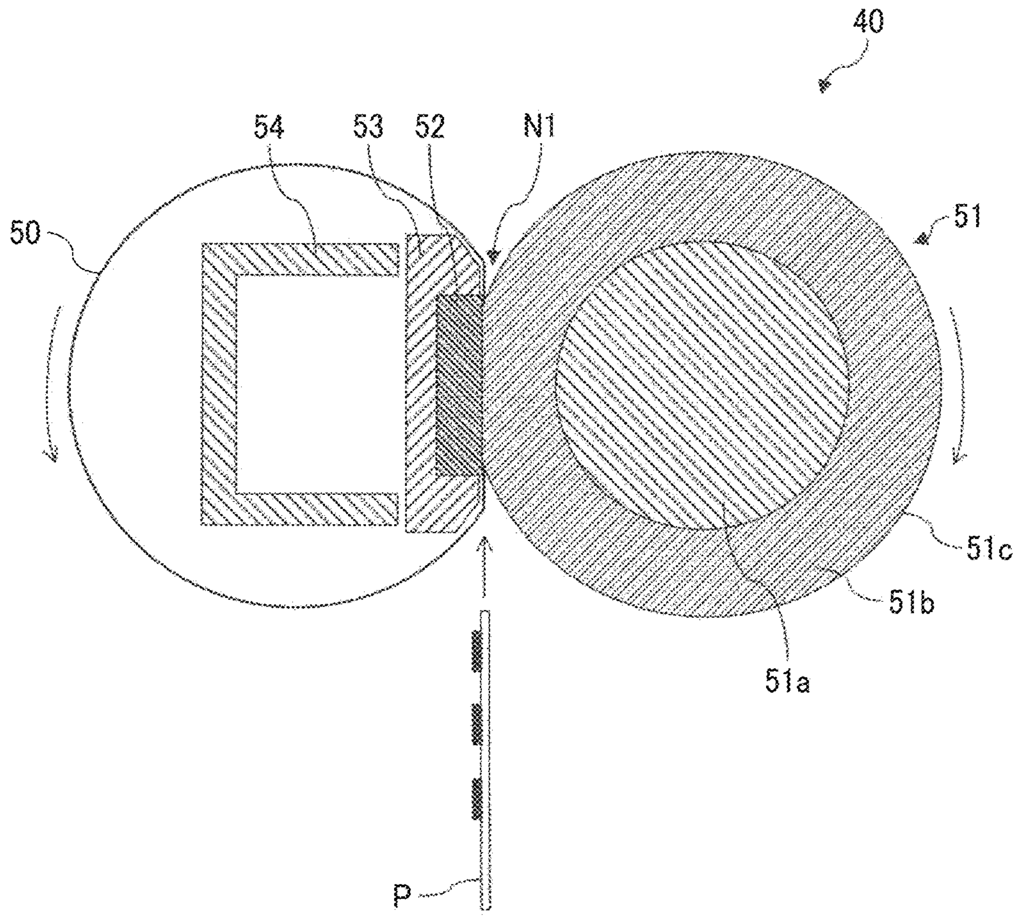
FIG. 3 is a schematic view of a part of a fixing device.

Next, a description is given of the fixing device 40 according to the present embodiment. FIG. 3 is a schematic view of a part of the fixing device 40 according to the present embodiment.

As illustrated in FIG. 3, the fixing device 40 according to the present embodiment includes a fixing belt 50, a pressure roller 51, a heater 52, a heater holder 53, and a stay 54. The fixing belt 50 is an endless belt as a fixing rotator. The pressure roller 51 serves as a pressure rotator and is in contact with an outer circumferential surface of the fixing belt 50 to form a fixing nip N1. The heater 52 as the heater heats the fixing belt 50.

The heater 52 is a planar heater having a longitudinal direction that is the same direction as the rotation axis direction of the fixing belt 50. The heater holder 53 as a holder holds the heater 52. The stay 54 serves as a reinforce and reinforces the heater holder 53 in the longitudinal direction.

The fixing belt 50 includes a tubular base that is made of polyimide (PI) and has an outer diameter of 25 mm and a thickness in a range of from 40 μm to 120 μm, for example. The fixing belt 50 further includes a release layer serving as an outermost surface layer. The release layer is made of fluororesin, such as tetrafluoroethylene-perfluoroalkylvinylether copolymer (PFA) and polytetrafluoroethylene (PTFE) and has a thickness in a range of from 5 μm to 50 μm to enhance durability of the fixing belt 50 and facilitate separation of the sheet and a foreign substance from the fixing belt 50. An elastic layer made of rubber having a thickness of from 50 to 500 μm may be interposed between the base and the release layer. The base of the fixing belt 50 may be made of heat resistant resin such as polyetheretherketone (PEEK) or metal such as nickel (Ni) and SUS, instead of polyimide. The inner circumferential surface of the fixing belt 50 may be coated with PI or PTFE as a slide layer.

The pressure roller 51 having, for example, an outer diameter of 25 mm, includes a solid iron core 51*a*, an elastic layer 51*b* formed on the surface of the core 51*a*, and a release layer 51*c* formed on the outside of the elastic layer 51*b*. The elastic layer 51*b* is made of silicone rubber and has a thickness of 3.5 mm, for example. Preferably, the release layer 51*c* is formed by a fluororesin layer having, for example, a thickness of approximately 40 μm on the surface of the elastic layer 51*b* to improve releasability.

The heater 52 extends in a longitudinal direction thereof throughout an entire width of the fixing belt 50 in the width direction of the fixing belt 50. The heater 52 is disposed so as to contact the inner circumferential surface of the fixing belt 50. The heater 52 may not contact the fixing belt 50 or may be in indirect contact with the fixing belt 50 via a low-friction sheet or the like. However, the heater 52 in direct contact with the fixing belt 50 enhances conduction of heat from the heater 52 to the fixing belt 50. The heater 52 may contact the outer circumferential surface of the fixing belt 50. However, if the outer circumferential surface of the fixing belt 50 is brought into contact with the heater 52 and damaged, the fixing belt 50 may degrade quality of fixing the toner image on the sheet P. Hence, the heater 52 contacts the inner circumferential surface of the fixing belt 50 advantageously.

The heater 52 includes, for example, a resistive heat generator coated with, for example, glass.

The heater holder 53 and the stay 54 are disposed inside the loop of the fixing belt 50. The stay 54 is configured by a channeled metallic member, and both side plates of the fixing device 40 support both ends of the stay 54. The stay 54 supports a stay side face of the heater holder 53, that faces the stay 54 and is opposite a heater side face of the heater holder 53, that faces the heater 52. Accordingly, the stay 54 retains the heater 52 and the heater holder 53 to be immune from being bent substantially by pressure from the pressure roller 51, forming the fixing nip N1 between the fixing belt 50 and the pressure roller 51. The fixing belt 50 is sandwiched between the pressure roller 51 and the heater 52 to form the fixing nip N1. In the present embodiment, the heater 52 functions as a nip formation member.

Since the heater holder 53 is heated to a high temperature by heat from the heater 52, the heater holder 53 is preferably made of a heat resistant material. The heater holder 53 is made of heat-resistant resin having low thermal conduction, such as a liquid crystal polymer (LCP) or polyether ether ketone (PEEK) and reduces heat transfer from the heater 52 to the heater holder 53 and provides efficient heating of the fixing belt 50.

A spring serving as a biasing member causes the fixing belt 50 and the pressure roller 51 to press against each other. Thus, the fixing nip N1 is formed between the fixing belt 50 and the pressure roller 51. As a driving force is transmitted to the pressure roller 51 from a driver disposed in the body of the image forming apparatus, the pressure roller 51 serves as a drive roller that drives and rotates the fixing belt 50. The fixing belt 50 is driven and rotated by the pressure roller 51 as the pressure roller 51 rotates. While the fixing belt 50 rotates, the fixing belt 50 slides over the heater 52. In order to facilitate sliding performance of the fixing belt 50, a lubricant such as oil or grease may be interposed between the heater 52 and the fixing belt 50.

When printing starts, the driver drives and rotates the pressure roller 51, and the fixing belt 50 starts rotation in accordance with rotation of the pressure roller 51. Additionally, as power is supplied to the heater 52, the heater 52 heats the fixing belt 50. In a state in which the temperature of the fixing belt 50 reaches a predetermined target temperature (that is, a fixing temperature), as a sheet P bearing the unfixed toner image is conveyed through the fixing nip N1 formed between the fixing belt 50 and the pressure roller 51 as illustrated in FIG. 3, the fixing belt 50 and the pressure roller 51 fix the unfixed toner image on the sheet P under heat and pressure.

Next, the AC banding is described with reference to FIG. 4.

Figure 4:
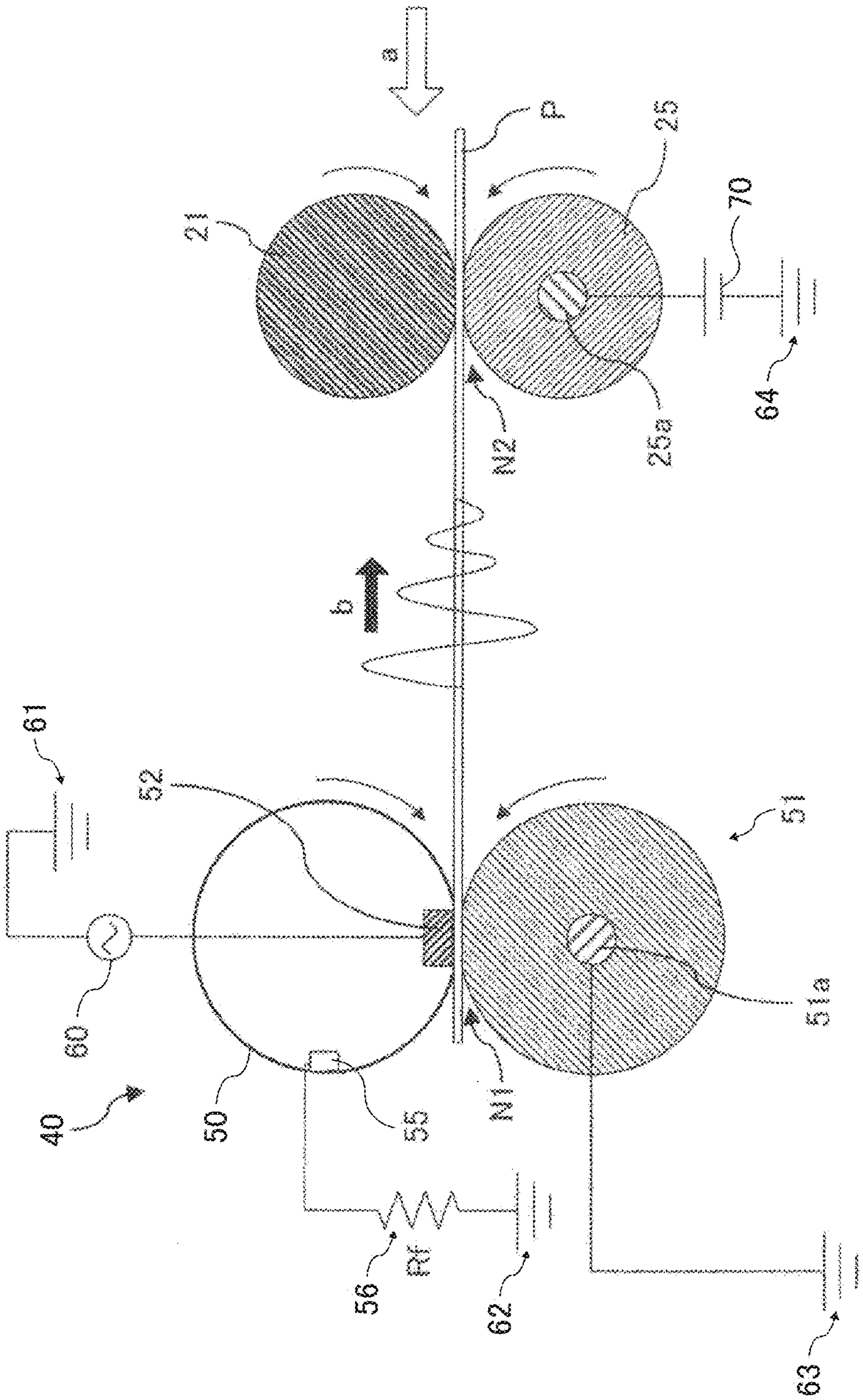
FIG. 4 is a diagram illustrating a part of the fixing device and a part of the transfer device in the image forming apparatus of FIG. 1 to schematically illustrate AC banding.

FIG. 4 is a diagram prepared with reference to "The Horizontal Banding Image Related to the Surface Heating Fuser System, Jun Asami Yoshida, Yastaka Yagi, Kenichi Karino, and Ken Oi, Canon, Inc. (Japan) NIP26 and Digital Fabrication 2010 Technical Program and Proceedings, pp. 238 to 241".

FIG. 4 schematically illustrates the transfer device, the fixing device, and the sheet P as the recording medium nipped at the fixing nip N1 and the transfer nip N2 at the same time.

The image forming apparatus according to the present embodiment includes the fixing device and the transfer device.

The fixing device 40 includes the fixing belt 50 and the pressure roller 51 as the pressure rotator. The pressure roller 51 faces the fixing belt 50 and forms the fixing nip N1.

The transfer device includes the secondary transfer roller 25 as the transferor and the secondary-transfer backup roller 21 as the opposed rotator that faces the secondary transfer roller 25 and forms the transfer nip N2.

The transfer device is disposed upstream from the fixing device in the conveyance direction of the sheet P as the recording medium. The fixing device includes the heater 52 as the heating unit inside the loop of the fixing belt 50, and the heater 52 is in contact with an inner circumferential surface of the fixing belt 50. The heater 52 is coupled to an alternating current (AC) power supply 60 as a power supply to apply an AC voltage to the heater 52.

As illustrated in FIG. 4, the fixing belt 50, the pressure roller 51, and the secondary transfer roller 25 are grounded via a first grounding path 62, a second grounding path 63, and a third grounding path 64, respectively. Specifically, a conductive portion of the fixing belt 50 is coupled to a protective resistance 56 via a contact 55 such as a brush, and the protective resistance 56 is grounded via the first grounding path 62. In other words, the fixing belt 50 is grounded via the first grounding path 62 including the contact 55 and the protective resistance 56.

In the example illustrated in FIG. 4, the core 51*a* of the pressure roller 51 is grounded via the second grounding path 63, and a core 25*a* of the secondary transfer roller 25 is grounded via the third grounding path 64 including a direct current (DC) voltage source 70.

As an application method of the secondary transfer bias, there are an attraction transfer method and a repulsive force transfer method.

In the attraction transfer method, the high voltage power supply applies a positive (+) bias voltage to the secondary transfer roller 25, and the secondary-transfer backup roller 21 is grounded to form a secondary transfer electric field.

In the repulsive force transfer method, the high voltage power supply applies a negative (−) bias voltage to the secondary-transfer backup roller 21, and the secondary transfer roller 25 is grounded to form the secondary transfer electric field.

In the example illustrated in FIG. 4, the DC voltage source 70 applies a bias to the secondary transfer roller 25, that is, the attraction transfer method is employed. The DC voltage source 70 is grounded via the third grounding path 64. In other words, the secondary transfer roller 25 is grounded via the third grounding path 64 including the DC voltage source 70.

In FIG. 4, a white arrow a indicates the conveyance direction of the sheet P as the recording medium. While the sheet P passes through the transfer nip N2 formed by the secondary transfer roller 25 and the secondary-transfer backup roller 21, the toner image on the transfer belt 15 is transferred onto the sheet P.

The sheet P to which the toner image has been transferred is conveyed toward the fixing device 40 in a direction indicated by the white arrow a in FIG. 4. While the sheet P passes through the fixing nip N1 formed by the fixing belt 50 and the pressure roller 51, the toner image is fixed onto the sheet P.

While the sheet P passes through the fixing nip N1, the sheet P as the recording medium is nipped at the fixing nip N1 and the transfer nip N2 at the same time, and the AC voltage applied to the heater 52 may be transmitted from the fixing nip N1 to the transfer nip N2 via the sheet P. For example, the sheet P having a high moisture content has a small impedance and easily transmits the AC voltage applied to the heater 52 to the transfer nip N2. In FIG. 4, a waveform schematically illustrates the transmission of the AC voltage from the fixing nip N1 to the transfer nip N2 via the sheet P, and a black arrow in FIG. 4 indicates a transmission direction of the transmission.

The AC voltage transmitted to the transfer nip N2 fluctuates the secondary transfer electric field in the transfer nip N2, thereby causing transfer unevenness. As a result, a stripe pattern (in other words, density unevenness) occurs in the image. The above-described phenomenon is called AC banding. The AC banding causes the density unevenness in the image, and a good image cannot be obtained. PTL 1 discloses a technique to prevent the occurrence of the AC banding, but the technique has problems such as an increase in manufacturing cost due to an increase in the number of components.

The AC power supply applies the AC voltage having an AC component (for example, 50 Hz) to the heater 52. The AC component is transmitted from the fixing nip N1 to the transfer nip N2 via the fixing belt 50 and the sheet P and superimposed on the secondary transfer electric field. As a result, a banding image is formed. The banding image has a band with a length corresponding to a cycle of the linear velocity of the sheet×1/50 Hz.

Figure 5:
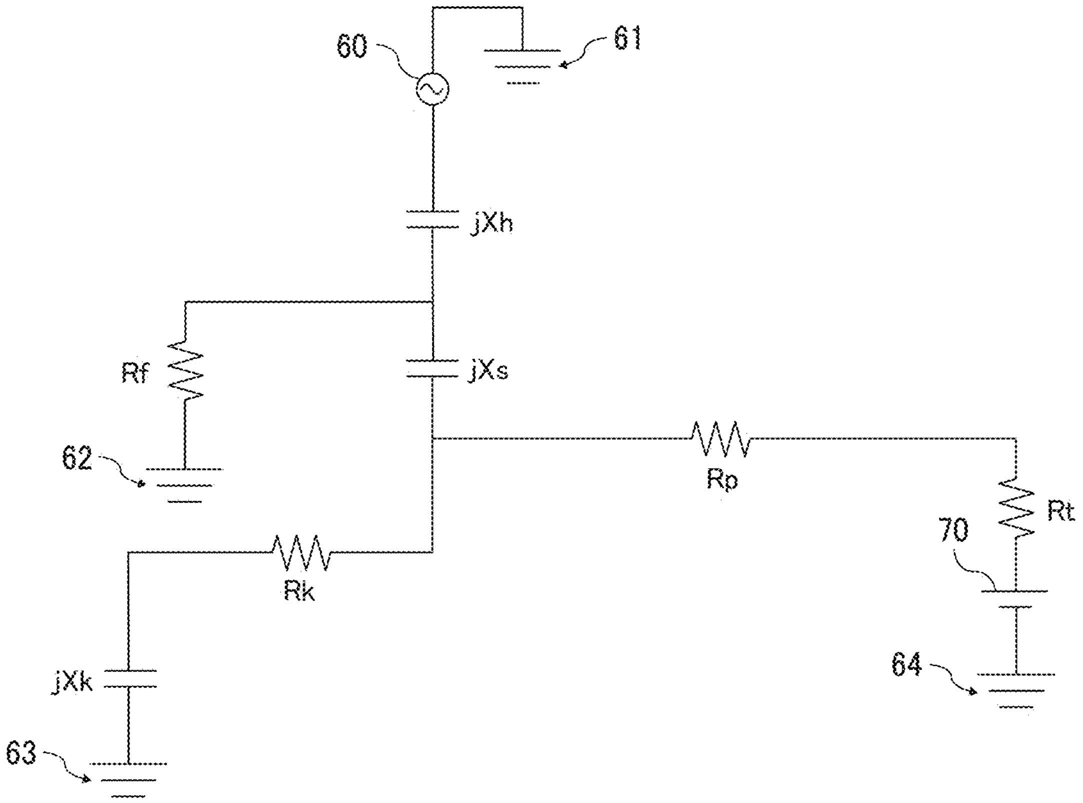
FIG. 5 is an equivalent circuit diagram of a configuration illustrated in FIG. 4.
Figure 6:
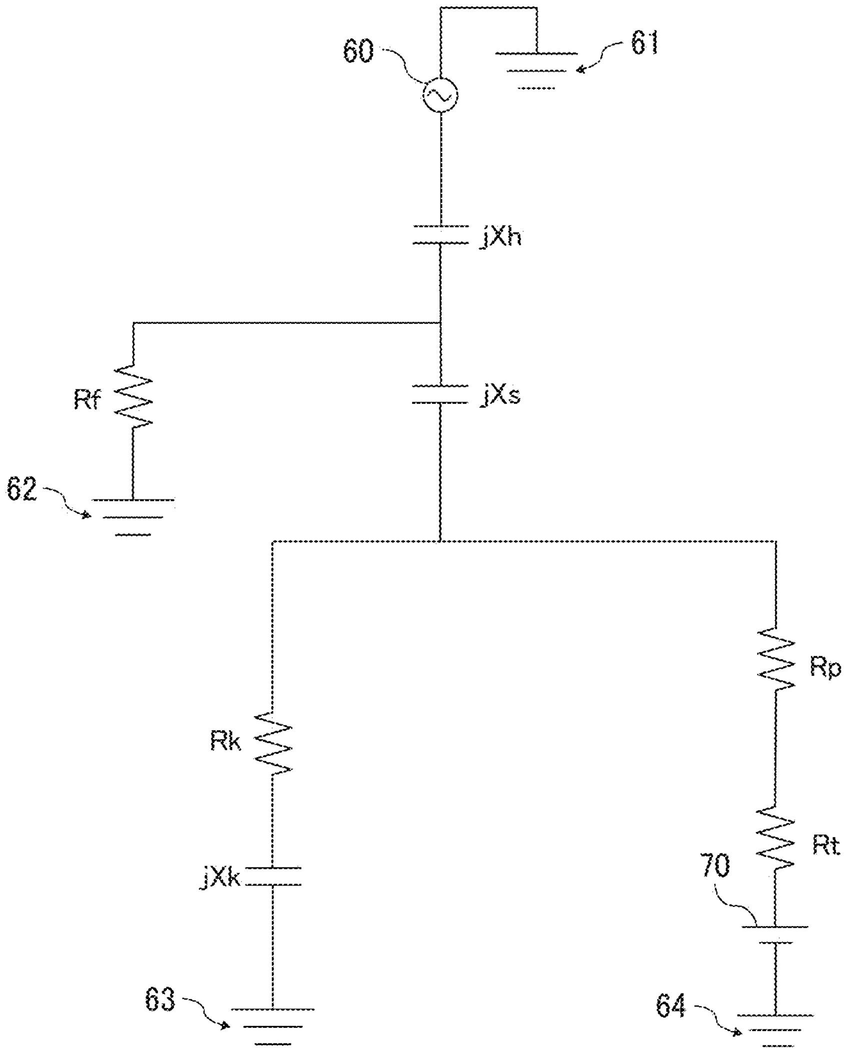
FIG. 6 is a circuit diagram in which the arrangement of a part of the circuit diagram of FIG. 5 is changed.

To prevent the occurrence of the AC banding, the present inventors have conducted intensive studies and reached the present disclosure. The following describes the embodiment of the present disclosure with reference to FIGS. 5 and 6. FIG. 5 is an equivalent circuit diagram of a configuration illustrated in FIG. 4. FIG. 6 is the same equivalent circuit as the equivalent circuit of FIG. 5, but the arrangement is partially changed for the purpose of explanation.

Symbols in FIG. 5 and FIG. 6 have the following meanings.

Rf means the fixing grounding resistance.

Rt means a transferor resistance.

Rp means a resistance value of a recording medium such as the sheet.

Rk means a resistance value of the pressure rotator such as the pressure roller.

jXs means an impedance of the fixing belt.

jXh means an impedance of the heater.

jXk means an impedance of the pressure rotator such as the pressure roller.

The fixing grounding resistance Rf is a resistance value of the fixing grounding resistance such as a resistance value of the protective resistance 56 between the fixing belt 50 and the ground in the first grounding path 62.

The transferor resistance Rt is a resistance value of the transferor such as a resistance value of a sponge portion of the secondary transfer roller 25 if the secondary transfer roller 25 is a sponge roller including the core 25*a* and the sponge portion. If the secondary transfer roller 25 is an ion conductive roller or an electron conductive roller, the transferor resistance Rt is the resistance value of the ion conductive roller itself or the resistance value of the electron conductive roller itself.

The resistance value Rk of the pressure rotator is, for example, a resistance value from the surface of the pressure roller 51 to the core 51*a* grounded.

The impedance JXs is the impedance of the fixing belt 50.

The impedance JXh is the impedance of the heater 52. The heater 52 includes, for example, the resistive heat generator coated with glass. The glass acts as a part of capacitor in the equivalent circuit. For this reason, the heater is expressed as the impedance jXh.

The impedance JXk of the pressure rotator is, for example, the impedance of the elastic layer 51*b* and the impedance of the release layer 51*c* in the pressure roller 51.

In order to prevent the AC voltage at the fixing nip N1 from being transmitted to the transfer nip N2 via the sheet P as the recording medium, reducing the resistance value of the secondary transfer roller 25 (that is, the transferor resistance Rt) is considered.

The AC voltage of the AC power supply 60 is applied and divided to three grounding paths. The three grounding paths are the first grounding path 62 from the fixing nip N1 to the ground via the fixing rotator such as the fixing belt, the second grounding path 63 from the fixing nip N1 to the ground via the pressure rotator such as the pressure roller, and the third grounding path 64 from the fixing nip N1 to the ground via the recording medium such as the sheet and the transferor such as the secondary transfer roller. The AC voltage applied to the third grounding path 64 from the fixing nip N1 to the ground via the recording medium such as the sheet and the transferor such as the secondary transfer roller fluctuates the secondary transfer electric field and causes the AC banding. Therefore, reducing the voltage applied to the third grounding path 64 prevents the occurrence of the AC banding. In order to reduce the voltage applied to the third grounding path 64 from the fixing nip N1 to the ground via the recording medium such as the sheet and the transferor such as the secondary transfer roller, the transferor resistance Rt is reduced. The resistance value Rp of the recording medium cannot be limited because a user can freely choose the sheet.

As a method of reducing the voltage applied to the transferor, reducing the fixing grounding resistance Rf may also be considered. Reducing the fixing grounding resistance Rf increases an alternating current flowing from the heater 52 to the fixing grounding resistance Rf and reduces an alternating current flowing to the recording medium and the transferor. As a result, the AC voltage applied to the transferor decreases.

However, reducing the fixing grounding resistance Rf has a problem that is a trade-off between the AC banding and lightning surge. Reducing the fixing grounding resistance Rf is advantageous for the AC banding but disadvantageous for the lightning surge. Reducing the fixing grounding resistance Rf prevents the occurrence of the AC banding. However, the image forming apparatus having a too small fixing grounding resistance Rf is easily damaged by the lightning surge. When a lightning occurs, a high voltage due to the lightning is applied from the AC power supply 60 to the image forming apparatus via the too small fixing grounding resistance Rf. A certain amount of the fixing grounding resistance Rf can prevent the image forming apparatus from being damaged by the lightning surge.

The present inventors have studied the above and found that reducing the transferor resistance Rt can prevent the occurrence of the AC banding even if the fixing grounding resistance Rf has the certain amount value and prevent the image forming apparatus from being damaged by the lightning surge. That is, reducing the transferor resistance Rt reduces the AC voltage applied to the transfer nip N2 via the sheet P as the recording medium to prevent the occurrence of the AC banding and enables obtaining a configuration advantageous to the lightning surge.

Setting an AC voltage division ratio of the AC voltage applied to the secondary transfer roller 25 to be smaller than 30% can prevent the occurrence of the AC banding.

However, setting too small transferor resistance Rt causes occurrence of an abnormal image such as a white spot or degradation in image uniformity. In addition, too small transferor resistance Rt may cause difficulty in obtaining good transferability in both a multi-color image portion such as an image portion on which three color toner images are superimposed and a single-color image portion that exist on the same image and reduce a transfer efficiency.

Considering the above facts, the present inventors have studied a preferable transferor resistance Rt. As a result, the present inventors found that the transferor resistance Rt satisfying the following Expression 1 gives a desired effect.

$$\left|\frac{Rf\,//\,(jXs+Rp+Rt)}{jXh+Rf\,//\,(jXs+Rp+Rt)}\cdot\frac{Rt}{jXs+Rp+Rt}\right|<0.3 \qquad \text{Expression 1}$$

Meanings of symbols in Expression 1 are as follows.

Rf means the fixing grounding resistance.

Rt means the transferor resistance.

Rp means the resistance value of the recording medium such as the sheet.

jXs means the impedance of the fixing belt.

jXh means the impedance of the heater.

Expression 1 does not include the resistance value Rk and the impedance jXk that are parameters of the pressure rotator such as the pressure roller 51. The pressure roller 51 usually has a thick elastic layer 51*b* having a much larger impedance than other parts in the other grounding paths. For this reason, since very little AC current flows in the second grounding path including the pressure rotator, the impedance and the resistance of the second grounding path including the pressure rotator can be omitted.

Figure 7:
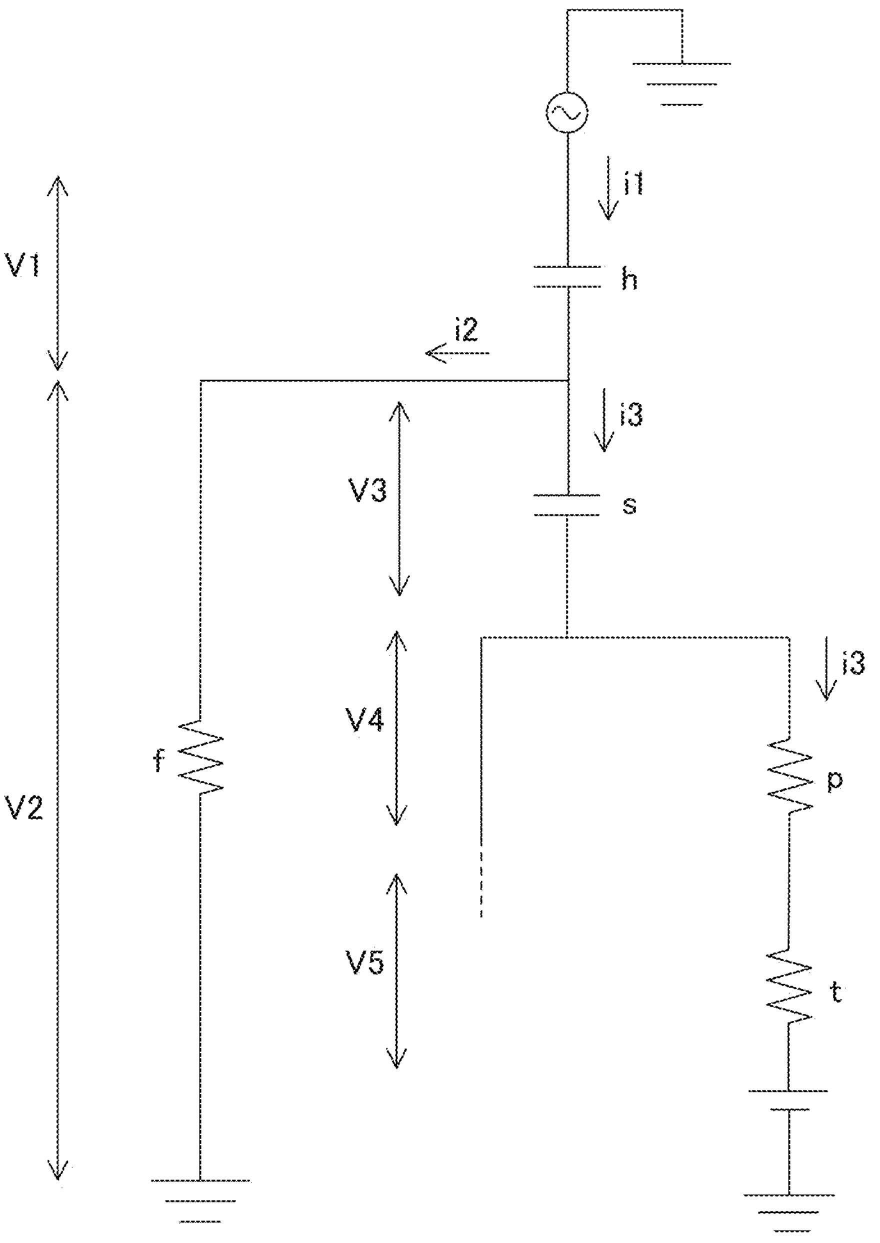
FIG. 7 is a circuit diagram in which the circuit diagram of FIG. 6 is expressed in another way.

With reference to FIG. 7, the following describes the derivation of Expression 1. FIG. 7 is a circuit diagram in which the circuit diagram of FIG. 6 is expressed in another way. As illustrated in FIG. 7, jXh is denoted by h, Rf is denoted by f, jXs is denoted by s, Rp is denoted by p, and Rt is denoted by t. In addition, voltages of AC components and currents of AC components are denoted by V1 to V5 and i1 to i3, respectively.

In order to set the AC voltage division ratio of the AC voltage applied to the secondary transfer roller to be smaller than 30%, the following expression is satisfied.

$$V5/(V1+V2)<0.3.*1$$

With reference to FIG. 7, V1 to V5 and i1 to i3 can be represented as follows.

$$V1 = i1\cdot h$$

$$\begin{aligned} V2 &= i2\cdot f \\ &= i3\cdot(s+p+t) \\ &= i1\cdot\left(f//(s+p+t)\right) \end{aligned}$$

$$V3 = i3\cdot s$$

$$V4 = i3\cdot p$$

$$V5 = i3\cdot t$$

Using the above relationships, the left side of the above expression *1 is expanded as follows.

$$\begin{aligned} V5/(V1+V2) &= i3\cdot t/(i1\cdot h + i1\cdot(f\,//\,(s+p+t)). \\ &= (i3/i1)\cdot\left(t/(h+f\,//\,(s+p+t)\right)*2 \end{aligned}$$

From FIG. 7, the following is obtained.

$$V2 = V3+V4+V5.$$

Using the above relationship, the above expression is expressed as follows.

$$i1\cdot(f\,//\,(s+p+t)) = i3\cdot(s+p+t)$$

This can be expressed as follows.

$$i3/i1 = (f\,//\,(s+p+t))/(s+p+t).$$

When expression *3 is substituted for expression *2, the result is as follows.

$$V5/(V1+V2)=\{(f\,//\,(s+p+t))/((s+p+t)\}\cdot\{t/(h+f\,//\,(s+p+t))=\{(f\,//\,(s+p+t))/(h+f\,//\,(s+p+t)\}\cdot\{t/(s+p+t)\}$$

Expression 1 is used to calculate the voltage division ratio, but since the complex number component of the capacitor is included, the voltage division ratio is also a complex number. Therefore, the amplitude of the voltage division ratio is obtained by taking the absolute value of the complex number. For this reason, the left side of Expression 1 is an absolute value.

The transferor resistance Rt is measured as follows.

The secondary transfer roller 25 is placed on a conductive metal plate, and a load of 4.9 N is applied to each of both ends of the core 25*a* of the secondary transfer roller 25. Therefore, totally, a load of 9.8 N is applied to the secondary transfer roller 25. Next, a voltage of 1000 v is applied between the core 25*a* and the metal plate, and a current value is measured. The transferor resistance Rt is obtained by dividing 1000 v by the measured current value. The measurement environment at this time is set to high temperature and high humidity (that is, 27° C. and 80%).

The fixing grounding resistance Rf is measured by measuring the resistance of the protective resistor. Terminals of a resistance measurement device are touched to both ends of the resistor, and the resistance is measured.

The resistance value Rp of the recording medium is measured as follows.

After the recording medium such as the sheet is placed for 24 hours or more under an environment for measurement, the surface resistivity was measured with a Type HA probe using a measuring instrument of Hiresta IP (MCP-HT450) manufactured by Mitsubishi Chemical Analytech Co., Ltd.

The impedance jXs of the fixing belt 50 and the impedance jXh of the heater such as the heater 52 are measured as follows.

Electrodes of an LCR meter are attached to the inner circumferential surface of the fixing belt and the outer circumferential surface of the fixing belt, measurement frequencies are set to commercial frequencies 50 Hz and 60 Hz which cause the AC banding, and resistance and capacitance (that give the impedance) are measured. The impedance of the heater is similarly measured by the LCR meter. Specifically, for each sample, the electrical resistance R (Ω) and the electrostatic capacity C (pF) in the thickness direction of the fixing belt were measured. The measurement method is two-terminal sensing, in which two electrodes are brought into contact with the inner peripheral surface of the fixing belt and the outer peripheral surface of the fixing belt, respectively, to measure the electrical resistance R and the electrostatic capacity with an LCR meter. The LCR meter used was "3522-50" manufactured by Hikoi E.E. Corporation (Nagano, Japan). The frequency used for the measurement was 50 Hz and 60 Hz. Furthermore, for general considerations, the measured electrical resistance was divided by the area A of the electrode (contact area to the fixing belt, i.e., 4.524 cm2) to calculate the electrical resistance per unit area R/A in the thickness direction of the fixing belt. Furthermore, for general considerations, the measured electrostatic capacity was divided by the area of the electrode (contact area to the fixing belt) to calculate the electrostatic capacity per unit area C/A in the thickness direction of the fixing belt.

The transferor resistance Rt satisfying Expression 1 sets the AC voltage division ratio to be smaller than 30%, which can prevent the occurrence of the AC banding. In addition, the transferor resistance Rt satisfying Expression 1 enables the configuration of the image forming apparatus that effectively prevents the damage due to the lightning surge. The above-described countermeasure against the AC banding by adjusting the transferor resistance Rt as in the present disclosure enables increasing the fixing grounding resistance Rf. Increasing the fixing grounding resistance Rf enables reducing a divided voltage applied to the impedance Xh of the heater (that is, for example, an insulation layer of the heater) in Expression 1. As a result, dielectric breakdown of the heater due to the lightning surge is likely to be avoided. When considering the lightning surge, the resistance value Rp of the recording medium and the transferor resistance Rt are not considered because an equivalent circuit regarding the lightning surge does not include the path from the recording medium to the transferor.

In order to satisfy Expression 1, for example, the following method may be considered. (1) Increasing the thicknesses of an insulation layer of the heater or the thickness of an insulation layer of the fixing belt to increase jXh and jXs. (2) Increasing the distance from the fixing position to the transfer position to increase the resistance value Rp of the recording medium. (3) Reducing the fixing grounding resistance Rf. (4) Reducing the transferor resistance Rt such as the resistance value of the secondary transfer roller 25.

Among them, the method of reducing the transferor resistance Rt such as the resistance value of the secondary transfer roller 25 as in (4) is preferable.

When the transferor resistance Rt is reduced, it is preferable to consider the relationship with the fixing grounding resistance Rf. A range of the transferor resistance Rt to set the AC voltage division ratio to be smaller than 30% varies depending on, for example, the fixing grounding resistance Rf, the thickness of the insulation material of the secondary transfer roller 25, and the distance from the fixing position to the transfer position. For example, when the fixing grounding resistance Rf is 2 MΩ, setting the transferor resistance Rt to be equal to or smaller than 1250 MΩ can set the AC voltage division ratio to be smaller than 30% and prevent the occurrence of the AC banding.

When the AC banding is considered, the AC voltage division ratio in the AC components may be referred to as an AC leakage rate. The AC voltage division ratio being smaller than 30% corresponds to the AC leakage rate being smaller than 30%.

The transferor resistance Rt is preferably equal to or smaller than 35 MΩ. The transferor resistance Rt that is equal to or smaller than 35 MΩ can give the AC voltage division ratio smaller than 30% regardless of the fixing grounding resistance Rf and prevent the occurrence of the AC banding.

The transferor resistance Rt is preferably equal to or greater than 5 MΩ.

The transferor resistance Rt that is equal to or greater than 5 MΩ can prevent the occurrence of the abnormal image such as the white spot or the degradation in image uniformity. In addition, too small transferor resistance Rt may cause difficulty in obtaining good transferability in both the multi-color image portion such as the image portion on which three color toner images are superimposed and the single-color image portion that exist on the same image. The single-color image portion is a portion having a single color toner in the image. A relatively low transfer voltage flows a sufficient current to transfer the single-color image portion to the recording medium.

The multi-color image portion is a portion having a plurality of color toners in the image. A suitable transfer voltage for transferring the multi-color image portion to the recording medium is higher than the suitable transfer voltage for transferring the single-color image portion to the recording medium. Setting the suitable transfer voltage for transferring the multi-color image portion causes an excessive transfer current for the single-color portion, which reduces the transfer efficiency.

In the present embodiment, based on the idea of reducing the transferor resistance Rt, the relationship among the fixing grounding resistance Rf and the like is expressed by Expression 1. The above-described configuration does not need a new component to prevent the occurrence of the AC banding and can prevent the manufacturing cost from increasing. In addition, without complicating the apparatus configuration, the present embodiment can effectively prevent the occurrence of the AC banding and the damage due to the lightning surge.

The heater 52 is a planar heater having a longitudinal direction that is the same direction as the rotation axis direction of the fixing belt 50. Using the above-described planar heater can efficiently heat the fixing belt 50.

In the embodiment illustrated in FIGS. 4 to 6, the attraction transfer method is used. The high voltage power supply applies the positive (+) bias voltage to the secondary transfer roller 25, and the secondary-transfer backup roller 21 is grounded. The image forming apparatus according to the present embodiment may use the repulsive force transfer method. In the repulsive force transfer method, the high voltage power supply applies the negative (−) bias voltage to the secondary-transfer backup roller 21, and the secondary transfer roller 25 is grounded. The relationship of Expression 1 does not change even in the image forming apparatus using the repulsive force transfer method.

In the embodiment illustrated in FIGS. 4 to 6, the secondary transfer roller is used as the transferor. However, the secondary transfer device in the present embodiment is not limited to the roller-type secondary transfer device and may be the belt-type secondary transfer device in FIG. 2.

Since the belt-type secondary transfer device also includes the secondary transfer roller 25, the belt-type secondary transfer device also has the transferor resistance Rt similar to the roller-type secondary transfer device. The relationship of Expression 1 does not change even in the image forming apparatus using the belt-type secondary transfer device.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority to Japanese Patent Application No. 2022-044148, filed on Mar. 18, 2022, in the Japan Patent Office, the entire disclosure of which is hereby incorporated by reference herein.

REFERENCE SIGNS LIST

21 Secondary transfer backup roller
25 Secondary transfer roller
50 Fixing belt
51 Pressure roller
52 Heater
55 Contact
56 Protective resistance
60 Alternating current (AC) power supply
70 Direct current (DC) voltage source
N1 Fixing nip
N2 transfer nip

The invention claimed is:

1. An image forming apparatus comprising:

a fixing device including:

a rotatable fixing belt configured to be grounded via a first grounding path from the fixing belt to a ground, the first grounding path including a protective resistor;

a heater configured to be in contact with an inner circumferential surface of the fixing belt; and a pressure rotator facing the fixing belt to form a fixing nip, the pressure rotator configured to be grounded via a second grounding path;

a power supply configured to apply an alternating current voltage to the heater; and a transfer device upstream from the fixing device in a recording medium conveyance direction of a recording medium, the transfer device including:

a rotatable transferor configured to be grounded via a third grounding path; and an opposed rotator facing the transferor to form a transfer nip, the transferor having a transferor resistance satisfying a following expression, $$\left| \frac{\frac{Rf}{jXs+Rp+Rt}}{jXh+\frac{Rf}{jXs+Rp+Rt}} \cdot \frac{Rt}{jXs+Rp+Rt} \right| < 0.3$$

where Rt is a resistance value of the transferor resistance, Rf is a grounding resistance value of the protective resistor, Rp is a resistance value of the recording medium, jXs is an impedance of the fixing belt, and jXh is an impedance of the heater.

2. The image forming apparatus according to claim 1, wherein the Rt is equal to or smaller than 35 MΩ.

3. The image forming apparatus according to claim 1, wherein the Rt is equal to or greater than 5 MΩ.

4. An image forming apparatus according to claim 1, wherein the heater is a planar heater having a longitudinal direction that is same as a rotation axis direction of the fixing belt.

5. The image forming apparatus according to claim 1, further comprising:

an image bearer configured to bear a toner image;

an intermediate transferor;

a primary transferor configured to primarily transfer the toner image from the image bearer to the intermediate transferor; and the transferor includes a secondary transfer roller configured to transfer the toner image from the intermediate transferor to the recording medium.

* * * * *